Patented Apr. 24, 1945

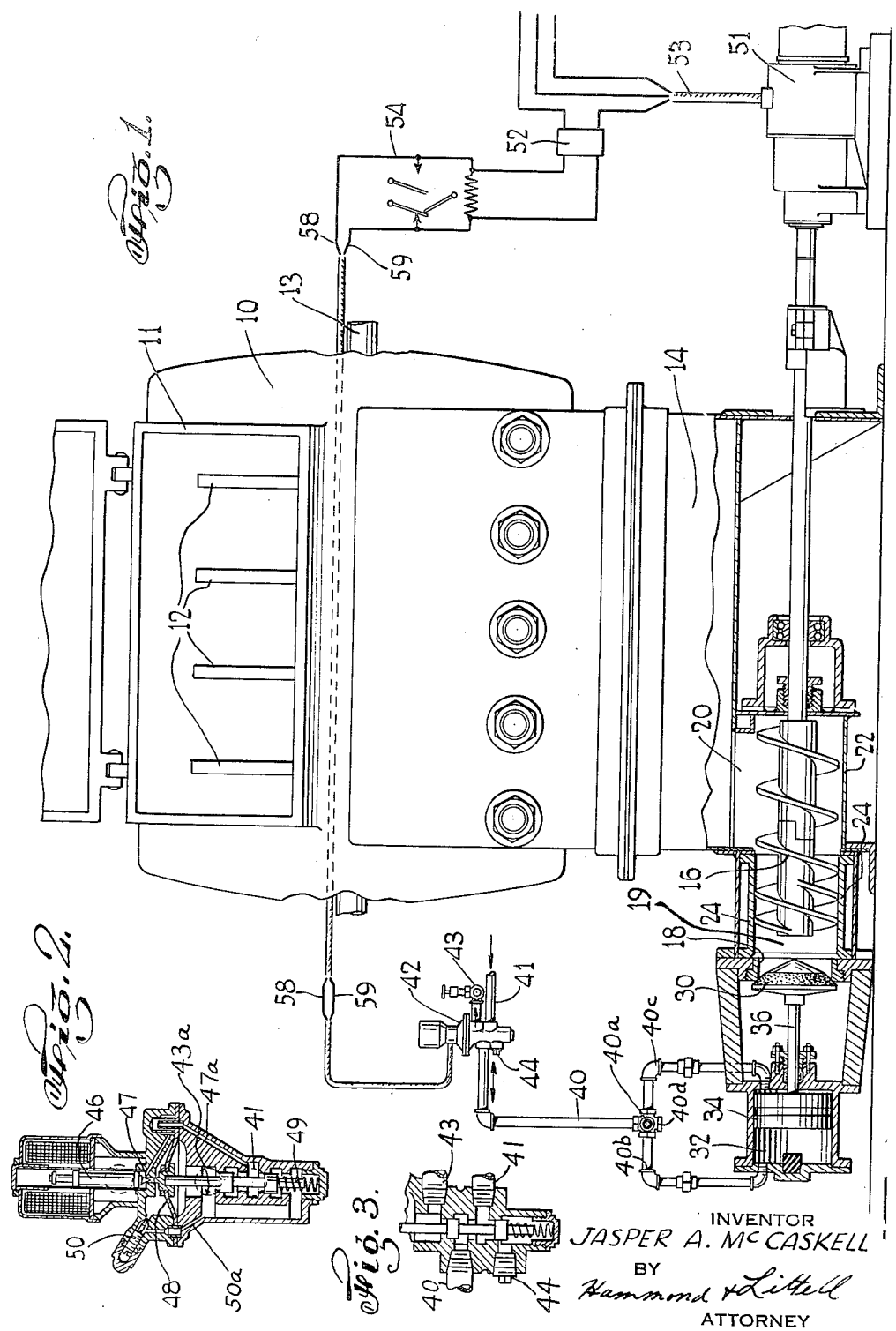

2,374,363

UNITED STATES PATENT OFFICE 2,374,363

CAKE DISCHARGER MECHANISM

Jasper A. McCaskell, Los Angeles, Calif., assignor to McCaskell Filters, Inc., Los Angeles, Calif., a corporation of California Application May 22, 1940, Serial No. 336,503

5 Claims. (Cl. 210—194)

This invention relates to pressure filters capable of continuous operation and, more particularly, to a mechanism for discharging filter cake therefrom.

Simple tapered nozzles, of the type described in my prior Patent No. 1,784,372, have in many cases proven adequate in the compacting and discharging of filter cake without permitting the escape of pressure fluid from the filter. In some cases, however, where the cake itself does not offer sufficient resistance to discharge, it has been found necessary to modify this structure by providing it with a valve. The constant resistance type valve controlled nozzle modification which has heretofore been used is also described in the same patent. This modified structure is particularly suitable for use in the discharge of slimy or talcy cake.

In some cases, however, when a cake has either a highly silicious nature or consists of coarse grained salts, its resistance to discharge increases at unexpected moments and to an unexpected degree. In the normal course of operation this type of cake may discharge freely for hours and then suddenly its resistance to discharge will increase. If the total resistance to discharge, that is, the resistance of the cake itself, plus the resistance offered by the valve, is not relieved in one manner or another, the horse power of the driving motor will in such cases increase sufficiently to kick out the overload relays and stop the operation of the entire filter press. Unexpected cessations of operation of this type are not only annoying but also result in temporary disruption of the plant process, etc.

One of the objects of this invention is to provide means for continuously removing filter cake of a highly silicious nature from the filter press, without fear of building up sufficient resistance to stop the operation of the filter press.

Another object of this invention is to provide means to keep the total resistance to filter cake discharge within certain predetermined limits.

A still further object of this invention is to provide automatic means for decreasing the total resistance to filter cake discharge, when such resistance exceeds a predetermined limit.

Another object of this invention is to provide efficient continuous filter cake discharge means for pressure filters.

I have found that the total resistance to filter cake discharge in pressure filters may be controlled and kept within a predetermined range by providing means for controlling the amount of resistance offered by the discharge valve to such discharge. I have further found that controlling means of this type may be made automatic by providing means operable by the variation in resistance to discharge to inversely change the degree of resistance offered by the discharge valve. This may be accomplished by a combination of means coacting with one another to produce the desired results. For example, means may be provided, operable by a change in the resistance to filter cake discharge, to inversely change the resistance offered by the discharge valve to the discharge of filter cake.

In the accompanying drawing, which illustrates one form of construction embodying features of my invention:

Figure 1 is a vertical elevation, partly in section, of a filter press, the discharge mechanism, and means to control the operation of the discharge mechanism;

Figure 2 is a vertical section of an electrically operated diaphragm-type valve; and Figure 3 is a vertical section through the valve taken substantially at right angles to the section of Figure 2.

The discharge mechanism of my invention includes in general a discharge nozzle, means for compressing and conveying filter cake toward the discharge nozzle, a discharge valve constructed to offer varying degrees of resistance to filter cake discharge through the nozzle, and means to inversely vary the resistance offered by the discharge valve as the total resistance to the discharge of the filter cake increases or decreases.

Referring more specifically to the drawing, the filter 10 which is of the continuous pressure type, is composed of a casing or housing 11, in which a series of filter elements, or leaves 12, is mounted on a hollow rotatable shaft 13 through which the filtrate is drawn off. Sludge is admitted to the inside of the casing and is then put under pressure to force the filtrate through the filtering medium and out the hollow shaft 13. The flow of the filtrate through the filter disks or leaves deposits a cake which is continuously scraped off by scrapers located in the lower portion of the filter and dropped into cake hopper 14.

A filter press of this type is described in greater detail in my prior Patent No. 1,266,133.

In order to make continuous operation of the filter possible, it is necessary to include in the construction of the filter, means for removing the filter cake scraped from the leaves or disks 12 without permitting the escape of the pressure medium. In the specific embodiment illustrated in Figure 1 of the drawing, this is accomplished by the coaction of the worm 16, the discharge nozzle 18 and discharge valve 30. The filter cake which has been scraped from the filter leaves 12 and dropped into hopper 14 is directed into the opening 20 in the cylindrical casing 22 where the revolving worm 16 conveys the filter cake toward discharge nozzle 18, while compressing it to squeeze out the fluid which escapes from the cylinder through holes 24. The tightly compressed cake which forms in the nozzle 18, the space 19 between the discharge valve 30, and the threads of the worm 18 acts as a seal which prevents the air and fluid under pressure in the filter from escaping while the solid cake may be continuously discharged.

The discharge valve 30, the counter pressure of which prevents a too easy discharge of filter cake and a loss of pressure in the filter, is provided with means for varying the pressure exerted by it upon the filter cake being discharged. This is accomplished in the illustrative example of such means shown in Figure 1, by a discharge valve cylinder 32 and piston 34 rigidly connected with the discharge valve by piston rod 36. Any variation in pressure in the cylinder 32 will directly affect the pressure on the piston 34 and, therefore, affect resistance offered by the valve 30 against the discharge of filter cake.

The pressure existing in the discharge cylinder may be controlled in any desirable manner. For example, the discharge cylinder 32 may be connected with a pressure source by a supply line 40, pressure control valve 42 and supply line 41.

A fourway valve 40a conveys the pressure fluid through the branch 40b to the left side of the piston 34 at all times when the filter is in operation. When it is desired to withdraw the valve 30 from the discharge nozzle 18 to permit inspection or repair, the valve 40a is turned by applying a wrench or tool to the squared end thereof to cause the air to flow through the branch 40c to the right side of piston 34 and to vent the branch 40b through the vent port 40d.

Although it is not essential that the control valve be electrically operated, I make use of an electrically operated three-way valve in preferred embodiments of my invention. The specific embodiment of the control valve 42 illustrated is a four-way diaphragm type valve, one outlet of which is closed with a plug 44. The specific type of valve illustrated is made by the General Electric Co. and designated in Circular GEA-2323A as "Three- or four-way diaphragm-type valve, CR9507-F1C or -F1D" although other types of valves may be used. The valve illustrated is operated by a solenoid 46 contained in the top of the housing. When the circuit operating the valve is closed, the coil is energized and the core rises upward, thus lifting the stem of the pilot valve 47 and opening the pilot valve 47. This permits the pressure material, normally compressed air, to flow from the line 41 through the channel 47a into the diaphragm chamber where its pressure is exerted against the large diaphragm 48. The diaphragm, which requires very little pressure differential for its operation, produces a positive movement in forcing the main valve down against the pressure of spring 49 as pressure in the chamber builds up. When this occurs the air in the line 40—40b and cylinder 32 is permitted to exhaust gradually through the valve 42 and needle valve 43 which is partially open, to thus gradually reduce the pressure in the cylinder 32 and decrease the resistance to cake discharge. As the resistance to cake discharge is reduced the current in the power line 53 to the motor 51 decreases and this causes the current to the solenoid 46 to be cut off. When the current is stopped, the pilot valve 47 drops into position and pressure against the diaphragm is removed, allowing spring 49 to force the main valve shut. An adjustable metering pin 50 in the discharge line 50a from the diaphragm chamber makes possible an adjustable time relay in closing. This valve is normally connected in the circuit in such manner that there is a free passage from the source of pressure supply 41 through the valve to the pressure line 40—40b leading to the discharge cylinder 32 when no current is being supplied to the circuit. When current is supplied, the pressure line 40—40b leading to the cylinder 32 is in direct communication with the third opening in the valve 43a which leads to a needle valve 43 left partly open, thus permitting pressure material to escape therethrough and decrease the pressure in the system gradually.

When an electrically operated valve of the type described above is used as the means to control the pressure existing in the discharge valve cylinder and thereby control the pressure of the discharge valve against the discharging filter cake, the pressure exerted by the valve can be made to vary inversely with the resistance to filter cake discharge. This can be accomplished by providing a switch in the electrically operated valve circuit, which will turn on the current in the circuit when the total resistance to filter cake discharge exceeds a predetermined value and turn off the current when the resistance drops to any predetermined value. In the particular embodiment illustrated in the drawing this is accomplished by passing the power line 53 to the motor 51 through a current transformer 52 which is wired to a snap action relay 54. The snap action relay is wired to the electrically operated valve and controls its action. The snap action relay is so adjusted that, under normal operating conditions, it opens the circuit through the lines 58 and 59 and the solenoid operated valve 42, thus de-energizing the valve and permitting a direct connection between the pressure supply line 41 and the line 40—40b leading to the filter cake discharge cylinder 32. However, when the current in the power line 53 increases beyond a certain predetermined limit, the snap action relay is set to close the circuit in lines 58 and 59. The closing of the circuit will supply electrical energy to the solenoid 46 and will cause the valve 42 to close the port between the pressure supply pipe 41 and line 40 and open the port between the line 40 and the line provided with the needle valve 43 through which the excess pressure in cylinder 32 can bleed out gradually.

The combination of means described above, specific embodiments of which are illustrated in the drawing, is adaptable for controlling and keeping the total resistance to filter cake discharge within specified limits and thus insures the continuous operation of the filter press, even when the filter cake is of a highly silicious nature. These means cooperate with one another as follows:

After the filter cake has been scraped from the filter leaves of the press and dropped into hopper 14, it is directed into the discharge cylinder where the screw conveyor 16 conveys it toward, and compresses it in, the discharge nozzle 18 and against discharge valve 30. In the normal course of operation, the screw conveyor will exert a sufficient pressure on the filter cake to overcome both the resistance to discharge offered by the filter cake itself and the resistance offered by the valve 30, thus permitting the cake to be discharged freely. However, if the total resistance to discharge suddenly builds up for some unexpected reason, the resistance to discharge will increase the power necessary to turn the screw 16. Since this screw is turned by motor 51, the increase in resistance will require an additional supply of power to the motor. As the horse power of the motor varies in proportion to the amount of current passing through the power line 53, any increase in power will increase the electric current in the power line 53. The increase in current will be transmitted to the snap action relay 54 through the current transformer 52, and will, if the current is sufficient, make the circuit by means of which the solenoid of control valve 42 is actuated, thereby changing the setting of the valve 42 and gradually reducing the pressure in the cylinder 32. When the resistance to cake discharge has decreased sufficiently to lower the power needed to drive the motor 51, the snap action relay 54 will snap back to the position which opens the circuit to the solenoid 46. When the coil of the solenoid is no longer energized, the pilot valve will close, the pressure on the diaphragm 48 will be relieved and the spring on the bottom of the valve will open the port between the pressure supply lines 41 and 40 and close the port leading to the partly open needle valve 43. This will permit the pressure existing in the discharge cylinder 32 to increase to that normal in the supply line 41. The total resistance to discharge will, therefore, decrease in proportion to the decrease in pressure of the valve 30 against the filter cake and increase when conditions are restored to normal.

It will be understood that the specific embodiment illustrated in the drawing and described in the specification is given by way of illustration and not as limitation of the discharger mechanism of my invention, and I, therefore, desire a broad interpretation of the invention within the scope and spirit thereof and limited only by the claims appended hereinafter.

I claim:

1. In combination with a pressure filter a discharge screw for discharging the filter cake, a motor for driving the discharge screw, a discharge valve for controlling the discharge of filter cake from the filter comprising a valve seat, a conical valve adapted to seat upon the valve seat and control the discharge of filter cake from the filter press, a valve stem carrying said valve, a piston connected to said valve stem and a fluid pressure cylinder in which the piston is mounted for reciprocation, a means for controlling the pressure in said cylinder by which the valve is pushed toward its seat, including a fluid pressure supply line normally in communication with said fluid pressure cylinder to urge said valve toward its seat, an electrically controlled valve in said fluid pressure supply line normally in pressure communicating position, electrically operated means for controlling said latter valve, a pressure discharge line from said electrically controlled valve and an adjustable needle valve in said discharge line for controlling the rate of discharge of pressure from said cylinder, and an electric circuit to said motor and to said electrically operated means and a relay in said circuit controlled by variations in the current requirements of said motor to shift said electrically controlled valve from pressure supplying to pressure discharging position to permit the escape of fluid from said fluid pressure cylinder.

2. In combination with a pressure filter a cake discharger comprising a substantially cylindrical casing, a screw conveyor for discharging filter cake rotatable therein, means to rotate said conveyor, a valve seat through which filter cake is discharged, a discharge valve seating on said valve seat to control discharge therethrough, fluid pressure means for actuating said discharge valve toward said valve seat, relay means actuated by an increase or decrease in the current transmitted to the conveyor rotating means to change the fluid pressure of said fluid pressure means inversely and proportionately to variations in current transmitted to the conveyor rotating means, said pressure changing means including a pressure line for conveying the fluid pressure for actuating the discharge valve toward its seat, a valve in said pressure line, means operable from the relay to change the setting of said pressure line valve from pressure supplying to pressure discharging position responsive to variations in the current transmitted to the conveyor rotating means and means to regulate the rate of the discharge of pressure fluid from the rear of the discharge valve when the pressure line valve is in discharging position.

3. In combination with a pressure filter, a cake discharger comprising, a substantially cylindrical casing, a screw conveyor for discharging filter cake rotatably mounted therein, a valve seat through which the filter cake is discharged, a fluid pressure actuated discharge valve seating on said valve seat, electrical means for rotating said screw conveyor, and means connected to the electrical means and actuated upon variation in current in said electrical means for varying the pressure actuating said discharge valve, said means including a pressure supply line for supplying pressure to urge said discharge valve toward its seat, an electrically operated valve in said pressure supply line, and a relay to change the setting of said electrically operated valve from pressure supplying to pressure discharging position when the current requirements for rotating said screw conveyor go up, and a pilot valve for regulating the rate of fluid pressure discharge when said electrically controlled valve is in pressure discharging position.

4. In combination with a pressure filter, a cake discharger comprising, a substantially cylindrical casing, a screw conveyor for discharging filter cake rotatably mounted therein, a valve seat through which the filter cake is discharged, a fluid pressure actuated discharge valve seating on said valve seat, electrical means for rotating said screw conveyor, and means connected to the electrical means and actuated upon variation in current in said electrical means for varying the pressure actuating said discharge valve, said means including a pressure supply line for supplying pressure to urge said discharge valve toward its seat, an electrically operated valve in said pressure supply line, and a relay to change the setting of said electrically operated valve from pressure supplying to pressure discharging position when the current requirements for rotating said screw conveyor go up, a needle valve for regulating the rate of pressure discharge when said electrically controlled valve is in pressure discharging position, and spring means adapted to restore the electrically operated valve to pressure supplying position.

5. In combination with a pressure filter, a motor, a discharge screw for discharging filter cake driven by said motor, a discharge valve for filter cake comprising a valve seat, a conical valve disposed adjacent said valve seat to seat thereon and control the discharge of filter cake from the filter press, a valve stem carrying said valve and slidably mounted in a fluid pressure cylinder and connected to a piston in said cylinder, and means for controlling the pressure in said cylinder including a fluid pressure supply line, normally communicating with said fluid pressure cylinder to press said valve toward its seat, an electrically controlled valve, a discharge line from said electrically controlled valve, and an adjustable needle valve in said discharge line for varying and controlling the fluid pressure in said cylinder whereby said conical discharge valve is yieldingly pressed against said valve seat at a predetermined pressure, an electrical circuit to said motor and to said electrically controlled valve, and means in said circuit for shifting said electrically controlled valve to change the pressure on said piston in said circuit.

JASPER A. McCASKELL.